Dec. 17, 1963   C. VOREAUX ETAL   3,114,424
AUTOMATIC HYDROSTATIC TRANSMISSION SYSTEM FOR A MOTOR VEHICLE
Filed April 15, 1960   5 Sheets—Sheet 5
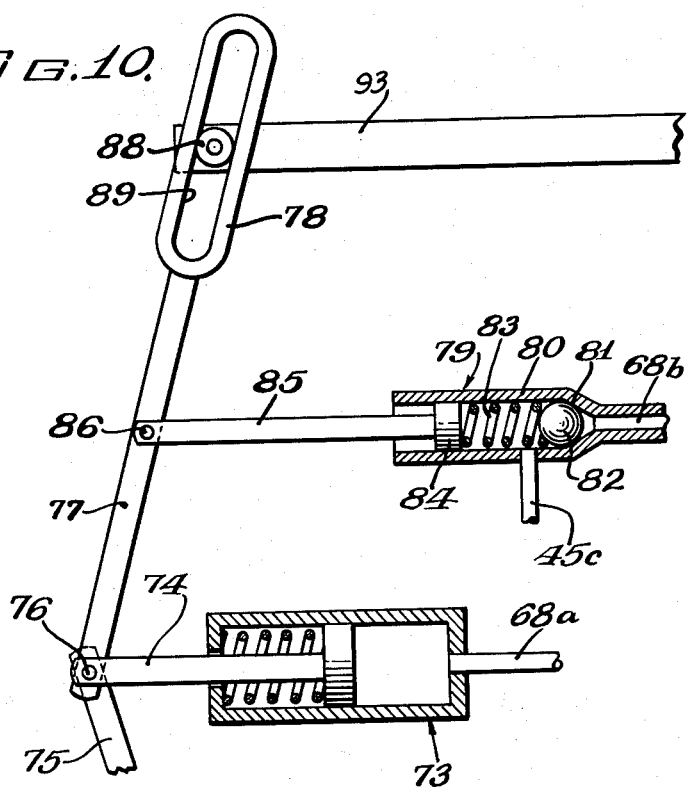
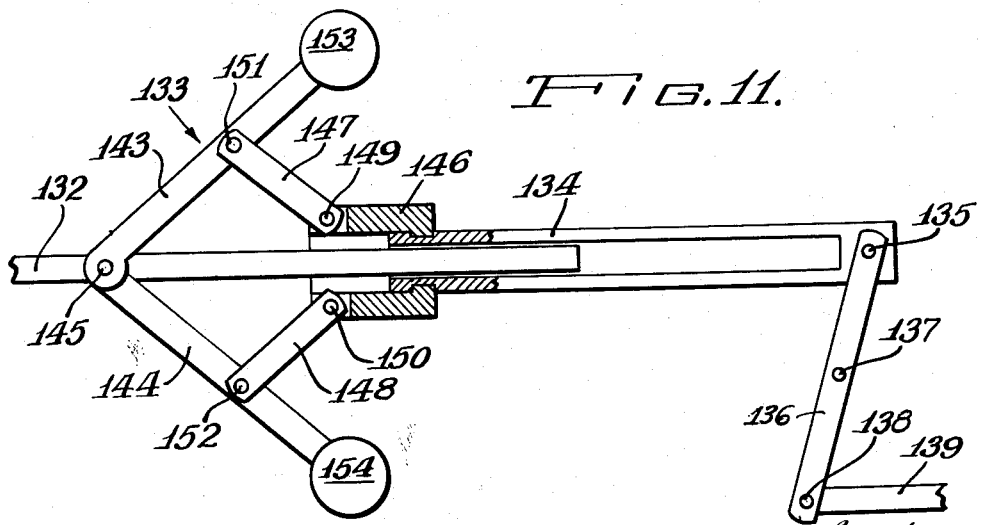
Inventors:
Claude Voreaux
Jean-Pierre Joyeux
Fernand Copie
   Atty.

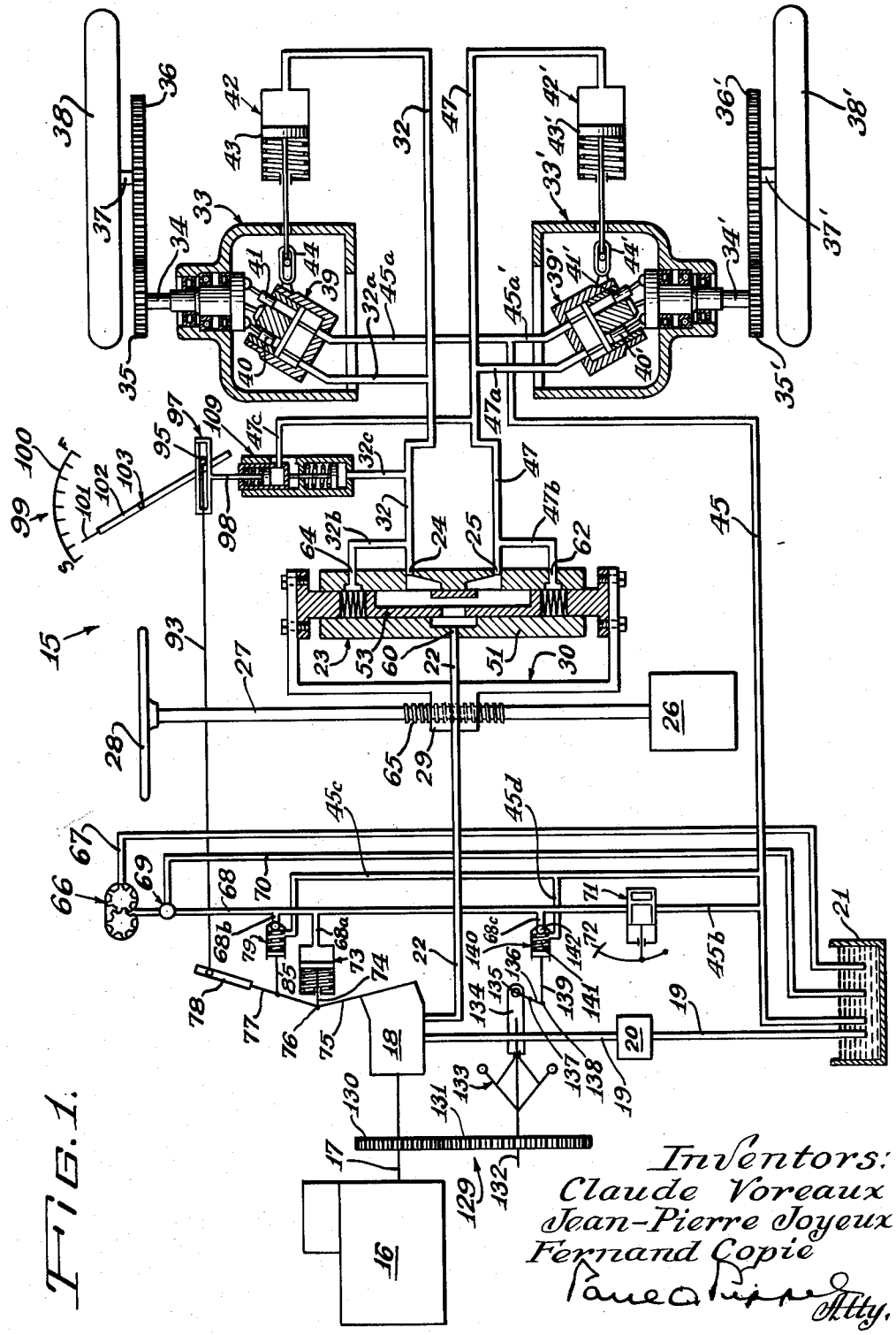

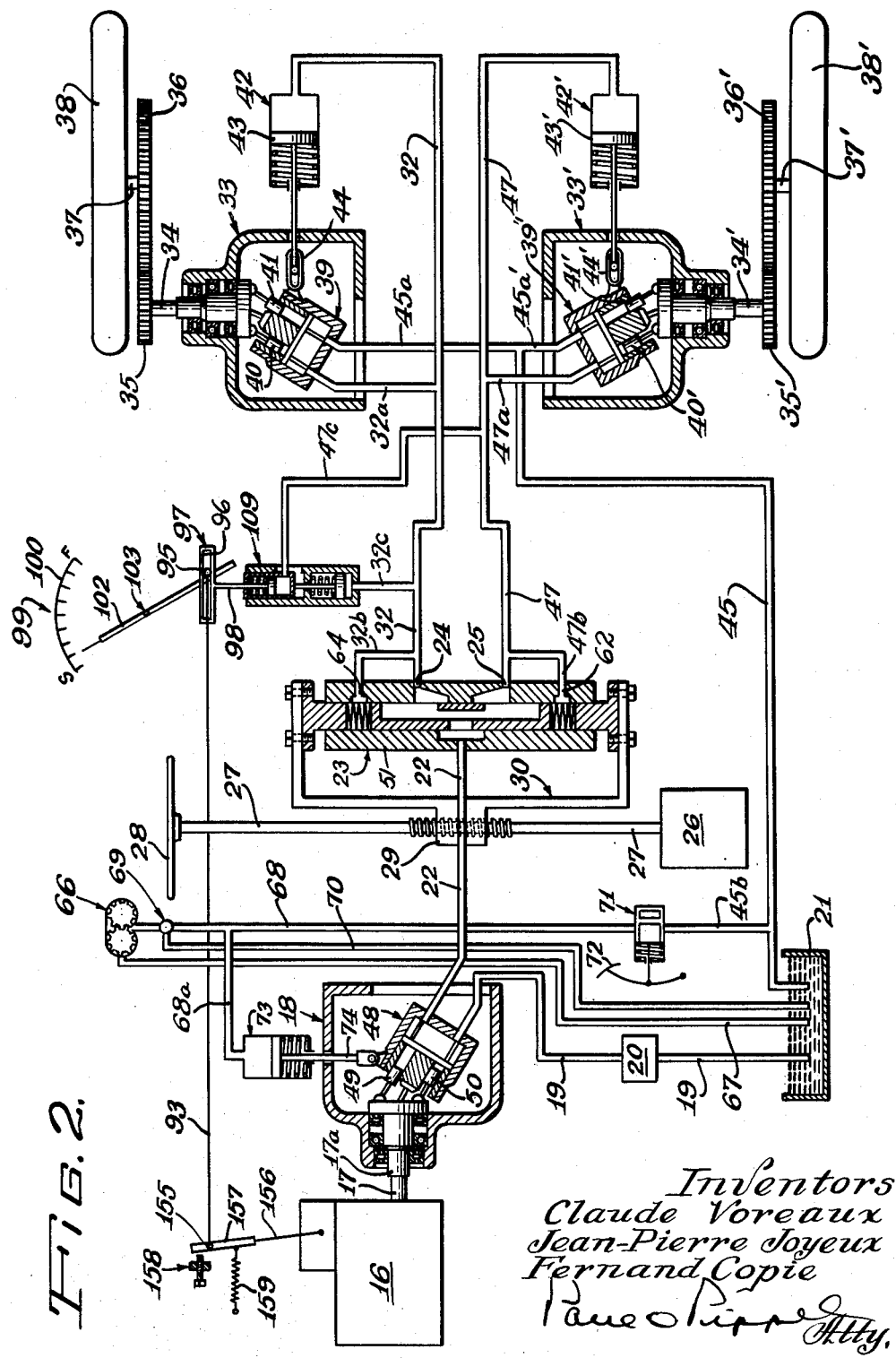

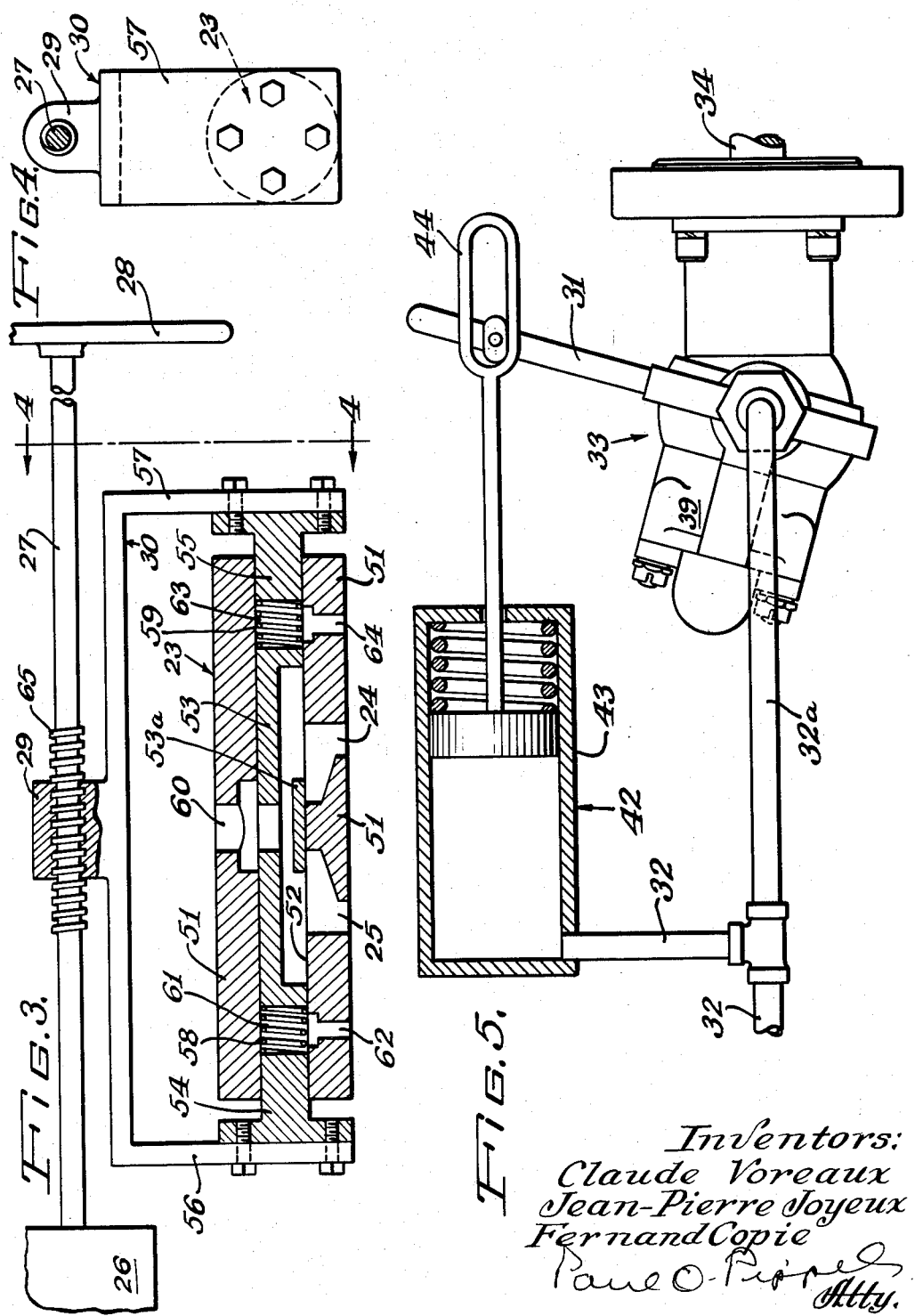

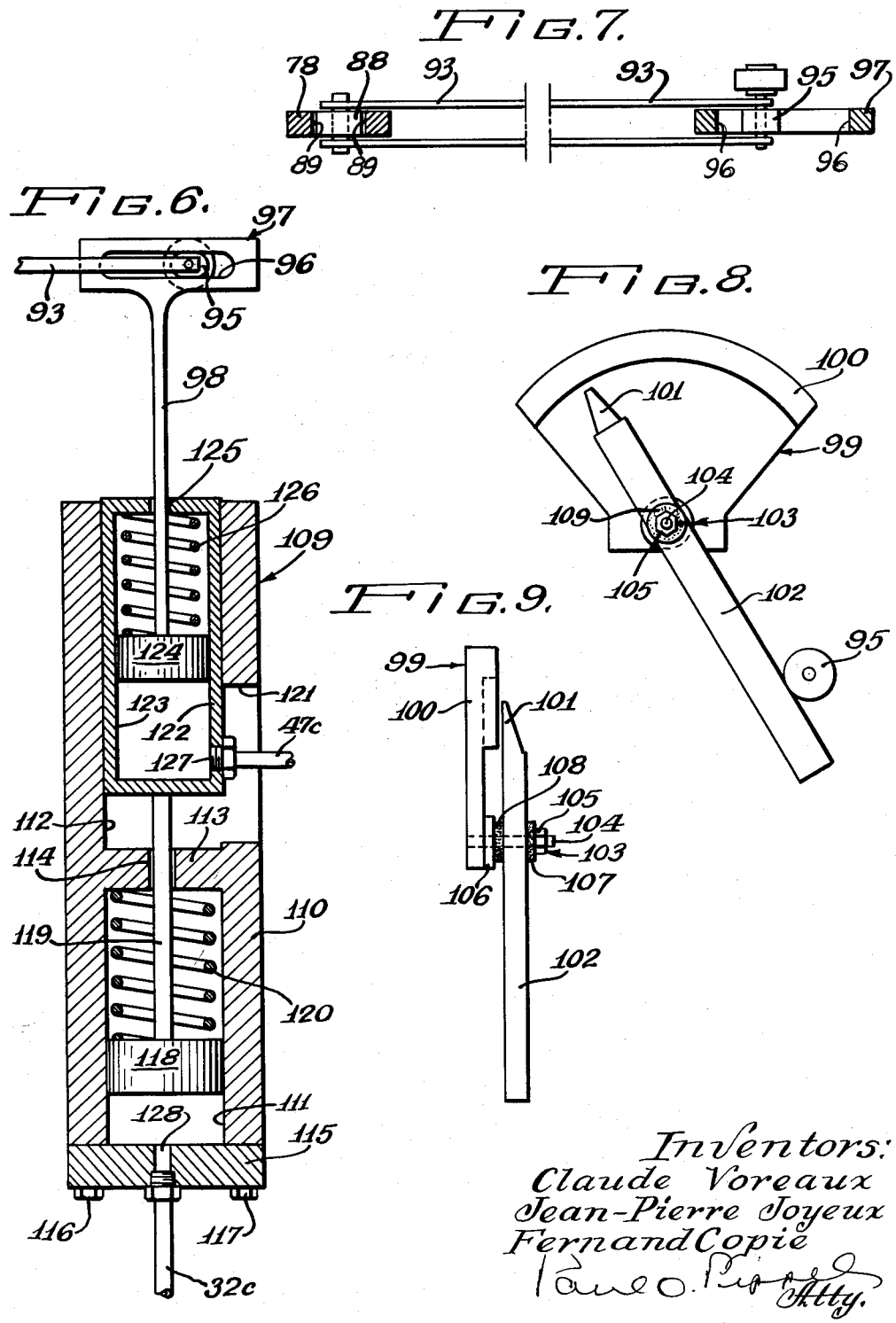

United States Patent Office 3,114,424
Patented Dec. 17, 1963

1

3,114,424
AUTOMATIC HYDROSTATIC TRANSMISSION SYSTEM FOR A MOTOR VEHICLE
Claude Vereaux, Saint-Cloud, and Jean-Pierre Joyeux and Fernand Copie, Saint-Dizier, France, assignors to International Harvester Company, a corporation of New Jersey
Filed Apr. 15, 1960, Ser. No. 22,615
Claims priority, application France Apr. 22, 1959
12 Claims. (Cl. 180—6.3)

This invention relates to a hydrostatic transmission system for a motor vehicle whereby the speed of the vehicle is maintained at or below a predetermined value and the engine is automatically throttled to compensate for varying fluid under pressure demand of the vehicle's fluid motors driving the ground engaging elements. The invention also contemplates a hydrostatic transmission system whereby the engine is throttled at a predetermined value and the speed of the vehicle is maintained at or below a predetermined value by automatically varying the delivery of the vehicle's source of fluid under pressure. More in particular the hydrostatic transmission system of this invention provides automatic means for pre-emptively delivering power from the engine to meet first the power requirements of the vehicle's power-take-off shaft and the remainder of the engine's power being available to the vehicle's ground engaging elements whereby the speed of the vehicle is maintained at or lower than a predetermined value so long as the total power requirements of the power-take-off shaft and ground engaging elements does not exceed the power delivered by the vehicle's engine.

In self-propelled vehicles when travelling in a straight line it is desirable that both driving ground engaging elements move at equal speed irrespective of variations in torque requirements of either or both ground drive elements, the upper speed limit being controlled by varying automatically the engine's throttle.

An important object of this invention is to provide means for automatically governing the throttle control of the engine in a hydrostatic driven vehicle whereby the speed of the vehicle is maintained at or below a predetermined value.

Where the vehicle, such as a hydrostatic driven tractor, is provided with a power-take-off shaft it is often desired that the speed of the power-take-off shaft is maintained substantially at a predetermined minimum value irrespective of torque variations required on the shaft. In some instances it is often desirable to fix the engine's throttle control for delivery of maximum horsepower at its selected speed. Now in the event that the combined power requirements for the power-take-off and propelling the vehicle exceed the power output of the engine, the speed of the engine obviously is reduced below its optimum speed. Since the power supplied by the engine to the power-take-off is pre-emptive, a means must be provided for reducing the power furnished to the hydrostatic drive mechanism for propelling the vehicle in favor of the power-take-off requirements. Another important object of this invention is to provide means, in a hydrostatic driven vehicle, for automatically governing the power distribution of the vehicle's engine whereby power is furnished pre-emptively to the power-take-off mechanism thereof and the remaining power is available for propelling the vehicle.

A still further object of this invention is to provide means for automatic adaptation of the velocity of movement of the vehicle to the resisting torque of the vehicle's ground drive engaging elements in order to obtain optimum use of delivered engine power thereby improving efficiency of the vehicle.

2

A yet further object of this invention is to provide means for predetermining selectively an upper limit of propelling speed such that the speed of the vehicle always remains lower or equal to the selected speed according to the power requirements of the vehicle in relation to the power delivered by the engine.

Another important object of this invention is means for providing automatic distribution of torque to each of two ground drive engaging elements as a function of resisting torque applied to each drive element whereby the ratio of speed of one drive element to the other drive element is maintained substantially at a predetermined fixed value.

A still further object of the invention is to assist steering of the vehicle by means of introducing a systematic differential between the speeds of each of the two ground engaging drive elements corresponding to movement of the steering control mechanism.

These and other desirable and important objects inherent in and encompassed by the invention will be more readily understood from the ensuing description, the appended claims and the annexed drawings wherein:

FIGURE 1 is a schematic in part and sectioned in part illustrating the essential drive parts of a tractor having the hydrostatic transmission system of this invention.

FIGURE 2 is similar to the embodiment shown in FIGURE 1 except that the power-take-off is eliminated and the control means is directed to the engine's throttle instead of the variable displacement fluid pump.

FIGURE 3 is an enlarged longitudinal sectional view of the fluid distributor valve shown in FIGURES 1 and 2.

FIGURE 4 is an end view of the distributor valve taken on line 4—4 of FIGURE 3.

FIGURE 5 illustrates a view of a variable displacement hydraulic motor connected to a servo-mechanism, in section, for governing the fluid displacement of the motor in response to fluid pressure.

FIGURE 6 is an enlarged longitudinal sectional view of a cumulative servo-device shown in FIGURES 1 and 2.

FIGURE 7 is a plan view, in section and partly broken away, illustrating the linkage between the cumulative servo-device of FIGURE 6 and the means for controlling the displacement of the fluid pump of FIGURE 1 or the engine throttle control of FIGURE 2.

FIGURE 8 is an enlarged front view of the vehicle speed controller and speed indicator shown in FIGURE 2.

FIGURE 9 is a side elevation of the speed controller of FIGURE 2 showing construction details thereof.

FIGURE 10 is an enlarged sectional view of the components for shifting the displacement control means of the variable displacement pump of FIGURES 1 and 2.

FIGURE 11 is an enlarged view, partly in section and partly broken away, illustrating the linkage means actuated by the fly-ball speed governor of FIGURE 1.

FIGURE 1 indicates the hydrostatic power transmission system for propelling a vehicle 15, such as a tractor of the wheeled type, having a conventional power plant 16. The power plant 16 may conveniently be comprised of an ordinary internal combustion engine such as a diesel or gasoline engine. The power plant 16 is provided with the usual rotatable drive shaft 17 connected in drive relation to a conventional fluid pump 18 of the variable displacement type. Thus the pump 18 driven by the power plant 16 represents the source of delivery of fluid pressure in this invention.

The pump 18 is provided with an inlet conduit 19 having optionally a conventional filter 20 interposed therein and leading to a sump or fluid reservoir 21 from which the pump 18 draws its fluid. The pump 18 is also provided with a fluid under pressure discharge conduit 22.

The numeral 23 (FIGURES 1 and 3) indicates an automatic fluid flow distributor or divider which functions to respond to a pressure differential occurring between its first and second fluid motor ports 24 and 25 respectively. At 26 is indicated a conventional steering mechanism with the usual steering column 27 and operator's manual steering wheel 28. In a wheel type vehicle 15 the steering mechanism 26 governs the steering movement of the forward wheels (not shown), in a conventional manner. The steering column 27 is provided with a running nut 29 which is an integral part of a bracket indicated at 30.

The first fluid motor port 24 of the distributor valve 23 is communicatively connected by the conduits 32 and 32a to a variable piston stroke first fluid motor generally indicated at 33 in FIGURES 1 and 2. The motor 33 is of conventional construction such as, for example, the type shown and described in U.S. Patent No. 2,487,617 to R. L. Tweedale. The motor 33 is provided with a rotatable output shaft 34 connected to a pinion gear 35. The pinion 35 in turn is in meshed relation with large gear 36. The gear 36 is connected in drive relation through shaft 37 to a ground engaging element or wheel 38 of the vehicle 15 such as, for example, a rear drive wheel of a tractor.

The means for varying the piston stroke and thus its fluid displacement of the fluid motor 33 is by shifting the angular displacement of the composite unit indicated at 39 with reference to the rotational axis of the shaft 34. Thus as the angular displacement of the unit 39 with respect to the axis of rotation of shaft 34 approaches alinement with each other the fluid displacement of the motor 33 diminishes because the piston stroke, of the pistons, two of which are shown at 40 and 41 in FIGURE 1, are shortened. From this it can be seen that for a selected flow rate of fluid under pressure through the conduit 32a the speed of the output shaft 34 will increase as the stroke of the pistons is shortened through corresponding reduction in angular displacement of the axis of unit 39 with respect to the axis of shaft 34. Theoretically at least when the unit 39 is alined with shaft 34 the speed of shaft 34 would be infinite at zero torque and the flow of fluid under pressure into the motor 33 by way of conduit 32a is zero. For practical purposes, of course, the fluid motor 33 is provided with stop means (not shown) for limiting the minimum angular displacement of the unit 39. The means for controlling the fluid displacement of motor 33 by shifting the angular displacement of the unit 39 is a servo-mechanism indicated at 42 which is actuated by the fluid pressure in conduit 32. The construction and operation of the servo-mechanism 42 with respect to the motor 33 is fully described in copending application of Claude Voreaux and Jean-Pierre Joyeux entitled "Hydrostatic Transmission Servo-Mechanism" assigned to the same assignee herein which copending application was filed on April 15, 1960, under Serial No. 22,605 now Patent No. 3,039,267. For purposes herein it is suffice to say that the one-way acting ram 43 is actuated by the fluid pressure in the conduit 32 but the angular displacement of the unit 39 is not increased until the ram 43 has moved a sufficient distance allowed by the lost motion link 44. The purpose of this lost motion link 44 is to provide a time delay before the angular displacement of the unit 39 through actuation of lever 31 (FIGURE 5) is changed from its minimum fluid displacement position responsive to increased fluid pressure in conduit 32.

The fluid discharge from the motor 33 is through the conduits 45 and 45a to the sump 21 as indicated in FIGURES 1 and 2.

The fluid power transmission from the motor port 24 for driving the wheel 38 has been described above. The means for driving the other wheel 38' of the vehicle from the second fluid motor port 25 of the distributor valve 23 is identical with that described for driving the wheel 38 from fluid under pressure from the motor port 24. Since the corresponding components for driving the wheel 38' are identical with that for driving the wheel 38 the corresponding components bear the same designation numerals except that each is primed and that the conduits 47 and 47a for the motor 33' corresponds to the conduits 32 and 32a, respectively, for the motor 33.

The variable displacement fluid pump 18 of FIGURES 1 and 2 is best illustrated in FIGURE 2. It will be seen that the construction of conventional pump 18 is similar to that of fluid motors 33 and 33', the principal difference is that the shaft 17a of the pump 18 is driven by the shaft 17 of the engine 16. Thus the operation of pump 18 is reverse to that of motors 33 and 33'. The means for varying the piston stroke and thus the fluid displacement of the pump 18 is by shifting the angular displacement of the composite unit 48 with reference to the rotational axis of shaft 17a. Thus as the angular displacement of the unit 48 with respect to the axis of rotation of shaft 17a approaches alinement with each other the fluid displacement of the pump 18 diminishes because the piston stroke of the pistons, two of which are shown at 49 and 50, are shortened. From this it can be seen that for a given speed of the engine 16 and shaft 17a the fluid displacement of the pump 18 increases with an increase in angular displacement of the unit 48 with respect to the axis of shaft 17a because the stroke of its pistons, e.g. 49 and 50, increases. Conversely as the unit 48 approaches alinement with shaft 17a the fluid displacement decreases because the stroke of its pistons correspondingly decreases. In the case of pump 18, contrary to that of fluid motors 33 and 33', the unit 48 may be alined with shaft 17a in which case the output of fluid to the conduit 22 becomes zero as the pistons of the pump 18 will be at zero stroke and no fluid pumping action occurs.

The automatic fluid flow distributor valve 23 is fully explained and shown in our copending application entitled "Hydrostatic Transmission System for Vehicles" assigned to the same assignee herein which copending application was filed on April 15, 1960 under Serial No. 22,614. Briefly the distributor 23 is comprised of a housing 51 (FIGURES 1, 2 and 3) having a longitudinal bore 52 therethrough having a slidable valve element or plunger 53 disposed therein. Disposed at each end of the housing 51 and extending slidably into the bore 52 is a pair of thrust members 54 and 55, respectively, as best shown in FIGURE 3. The bracket 30 is provided with a pair of parallel disposed arms 56 and 57, respectively. The arm 56 is rigdly connected to thrust member 54 and arm 57 is rigidly connected to thrust member 55. Between the thrust members 54 and 55 and plunger 53 there is disposed a pair of calibrated compression springs 58 and 59. Thus when the bracket 30 is shifted in a longitudinal direction the plunger 53 is resiliently urged in the same direction. From FIGURE 3 it will be seen that the housing 51 and plunger 53 are so grooved that when, for example, the plunger is moved leftwardly the portion 53a of the plunger 53 throttles downwardly the flow of fluid from inlet port 60 to motor port 25, while at the same time increasing correspondingly the flow of fluid from inlet port 60 to motor port 24. Movement of bracket 30 rightwardly of course results in the reverse action from that just described. From this it is evident that when the plunger 53 is centrally positioned as shown in FIGURE 3, the flow of fluid from inlet port 60 is divided equally between motor ports 24 and 25. Movement in either direction of plunger 53 from the position shown correspondingly changes the ratio of fluid flow through motor port 24 with respect to flow through motor port 25.

From FIGURE 3 it will be seen that the spring 58 is disposed within a compartment 61 communicatively connected to the conduit 47 (FIGURE 1) through port 62 and conduit 47b. Thus the fluid pressure in compartment 61 is equal to that of motor port 25. Likewise the other spring 59 is disposed in compartment 63 communicatively connected to port 64 and conduit 32b and therefore the fluid pressure in compartment 63 is equal to that of motor port 24.

Assuming for the moment that the bracket 30 is maintained in the position shown in FIGURE 3 it will be seen that if a pressure differential occurs between conduits 32 and 47 the same pressure differential also occurs in the compartments 61 and 63. The pressure differential exerts piston action on the plunger 53 to move it in the appropriate direction. For example if the flow of fluid in conduit 32 encounters a resistance greater than that occurring in conduit 47 the pressure in conduit 32 will increase above that in conduit 47. The pressure differential thus formed urges the plunger 53 leftwardly which reduces the flow in conduit 47 and correspondingly increases the flow in conduit 32 to compensate for the increased resistance to fluid flow in conduit 32. Movement of the bracket 30 by means of the threaded portion 65 of steering column 27 in running nut 29 will be described later.

Referring back to FIGURES 1 and 2 the vehicle 15 is provided with a small constant displacement fluid pump 66 which may be a conventional gear pump driven by an electric motor (not shown). The pump 66 draws fluid from the sump 21 through conduit 67 and discharges under pressure into conduit 68. Interposed in the conduit 68 is small pressure relief valve indicated at 69 which serves to define the upper limit of pressure in conduit 68. Fluid discharged by the relief valve 69 is returned to the sump 21 through relief conduit 70. Also connected to conduit 68 is a spring loaded normally closed manually operated valve 71 which may conveniently be opened by the vehicle's operator by actuation of pedal 72. The discharge side of valve 71 is connected to conduit 45b which communicates with sump 21 through conduit 45. Thus it is evident that actuation of the valve 71 to open position by the operator serves to discharge directly to the sump 21 fluid pressure from the pump 66 thus reducing the pressure in conduit 68.

Disposed adjacent to the pump 18 is a one-way acting spring loaded ram or servo-mechanism 73 which is communicatively connected to the conduit 68 through connecting conduit 68a. From this it can be seen from FIGURE 2 that when conduit 68 is pressurized the ram 73 actuates through rod 74 to increase the angular displacement of the composite unit 48 of the pump 18 thereby increasing the fluid displacement of the pump 18. When the pressure in conduit 68 is reduced or entirely removed the angular displacement of the unit 48 is correspondingly reduced and thus if the pressure is reduced to a low value the output of the pump 18 will be zero.

Referring now to FIGURES 1 and 10 it will be seen that the linkage for the ram 73 and the composite unit 48 of the pump 18 is modified from that shown in FIGURE 2. In FIGURE 1 the composite unit 48 of the pump 18 is provided with a lever 75 which is similar to the lever 31 of the motor 33 shown in FIGURE 5. Thus as viewed in FIGURE 1 the arcuate movement of lever 75 in a counter-clockwise direction increases the fluid displacement of pump 18 and, conversely, when moved in a clockwise direction reduces the displacement of pump 18. The rod 74 of ram 73 is pivotally connected at 76 to the lever 75 as best shown in FIGURE 10. Thus actuation of the ram 73 results in the increase of fluid displacement of the pump 18. Also pivotally connected at 76 is a link element 77 having a lost motion member 78 rigidly connected to the opposite end thereof. Positioned adjacent to the link element 77 is a conventional adjustable relief valve indicated at 79 as best shown in FIGURE 10. The relief valve 79 is comprised of a hollow casing 80 provided with a valve seat 81 adapted to receive in seating relation the ball 82. The ball 82 is urged towards seating position by one end of a calibrated spring 83. The other end of the spring 83 is in abutting relation with a piston 84. A rod 85 connected to the piston 84 extends outwardly and is pivotally connected to link element 77 at 86. The fluid inlet side of the valve 79 is communicatively connected to conduit 68 through conduit 68b and the outlet side is connected to conduit 45c. Thus it can be seen that as the rod 85 and its piston moves in a rightward direction, as viewed in FIGURE 10, the spring 83 is further compressed which means that the fluid pressure in conduits 68 and 68b required to unseat the ball 82 is correspondingly elevated. From this it is evident that shifting of the rod 85 adjustably controls the maximum pressure in the conduit 68b.

Referring again to FIGURES 7 and 10 the lost motion member 78 is connected to one end of a control rod 93. The rod 93 is provided with a roller 88 (FIGURE 10) which is slidable in the elongated slot 89 of the lost motion member 78. Thus movement of the control rod 93 in a horizontal direction serves to move the link element 77 about the pivot 76. The rod 93 of course may be supported by any convenient means such as by rollers (not shown). Disposed in pivotal relation on the other end of the control rod 93 is a slide element or roller 95 as best shown in FIGURES 6 and 7. The slide element 95 is slidable in the slot 96 of a lost motion member 97 which is integral with piston rod 98.

Referring now to FIGURE 1 there is disposed a speed indicator generally indicated at 99. The indicator 99 consists of a stationery graduated dial 100 having a stop (S) position and full speed (F) position with intermediate speeds therebetween. The pointer 101 is integrally connected to a track guide member 102 as best seen in FIGURES 8 and 9. The track guide member 102 is supported by a fixed pivot assembly 103 which may be loosened for pivotal movement. The pivot assembly 103 may be comprised of a stationery stub shaft 104 mounted on the lower portion of the dial 100. The stub shaft 104 extends through a bore in the guide member 102 and the outer end provided with threads (not shown) and nut 105 fitted thereto. Disposed against the dial 100 on the stub shaft 104 is a spacer or washer 106. Also disposed on each side of the guide member 102 are friction elements such as fibre washers 107 and 108. Thus when the nut 105 is loosened the guide member 102 pivots freely about the stub shaft 104. Conversely when the nut 105 is tightened the guide member 102 is precluded from rotation about the stub shaft 104.

Referring now to FIGURES 1, 2 and 6 it will be seen that the piston rod 98 forms a part of a cumulative servo-device generally indicated at 109 the construction of which is best illustrated in FIGURE 6. Basically the cumulative servo-device 109 comprises a pair of spring loaded one-way acting rams connected together in mutually co-active relation. The servo-device 109 comprises a housing 110 having a first cylindrical bore 111 and a second cylindrical bore 112 disposed in axial alinement and separated by wall 113 with a small bore 114 therethrough in axial alinement with the bores 111 and 112. The bore 111 is closed by an end plate 115 secured to the housing 110 as by bolts two of which are shown at 116 and 117. Within the bore 111 is disposed a first piston 118 secured to a connecting rod 119. Also within the bore 111 is a compressive spring 120 which urges the piston 118 in a retractive direction. The bore 112 is provided with an opening or groove 121 extending transversely through the housing 110. Within the bore 112 in slidable relation is a cylindrical casing 122 secured to the connecting rod 119 as shown in FIGURE 6. The casing 122 is provided with a cylindrical bore 123 within which is disposed a second piston 124 secured to the piston rod 98, the rod 98 extending through a small bore 125 in the casing 122. A compressive spring 126 is positioned in the casing 122 for urging the piston 124 in a retractive direction. A port 127 for energizing the piston 124 is provided in the casing 122 communicatively connected to conduit 47c. The end plate 115 is also provided with port 128 for energizing the piston 118 communicatively connected to conduit 32c. When the piston 118 is energized the connecting rod 119 moves the casing 122 advanceably, the conduit 47c moving with the casing 122 in the groove or opening 121 in the housing 110. From this it can be seen that movement of the piston rod 93 and its associated lost motion member 97 with respect to the housing 110 is a cumulative function of the energizing of either or both of the pistons 118 and 124 and thus represents the mean or average pressure in conduits 32 and 47.

Referring to FIGURE 1 of the drawings it will be seen that the vehicle 15 is equipped with a power take-off device indicated generally at 129. The power take-off device may comprise a first gear 130 secured to the drive shaft 17 in meshed relation with second gear 131 secured to a power take-off shaft 132. Of course it should be understood that the power take-off device 129 may be of any conventional type. Secured to the shaft 132 is a conventional fly-ball speed governor generally indicated at 133 in FIGURES 1 and 11. The governor 133 is provided with an actuator lever 134 having its end pivotally connected at 135 to one arm of a rock arm 136. The rock arm 136 is mounted on a fixed pivot at 137. The other arm of the rock arm 136 is pivotally connected at 138 to the rod 139 of an adjustable relief valve indicated at 140. The valve 140 is constructed similarly to the adjustable relief valve 79 illustrated in FIGURES 1 and 10. The inlet side of relief valve 140 is connected communicatively to conduit 68 through conduit 68c as shown in FIGURE 1. From this it is apparent that as the speed of the power take-off shaft 132 increases the fly-ball governor moves the actuator lever 134 leftwardly as viewed in FIGURE 1 which increases compression of spring 141 for urging the ball 142 into seating relation in the valve 140.

Referring to FIGURE 11 the fly-ball speed governor 133 is of conventional design. It may consist of a pair of arms 143 and 144 pivotally connected at 145 to the shaft 132. The actuator lever 134 is slidable longitudinally on the shaft 132 but constrained against rotation therewith. An axially movable shift member 146 is constrained for rotation with the shaft 132 by one end of links 147 and 148 pivotally connected at 149 and 150, the other end of the links 147 and 148 being pivotally connected at 151 and 152 to arms 143 and 144 respectively. Thus as the speed of shaft 132 increases the fly-balls 153 and 154 on the ends of arms 143 and 144, respectively, move outwardly which moves actuator lever 134 leftwardly. Conversely as the speed of shaft 132 decreases the radial distance of the fly-balls 153 and 154 with respect to shaft 132 diminishes thus urging rightward movement of the lever 134.

Referring to FIGURE 1 the embodiment of the invention therein shown is adapted for employment with a fixed engine throttle setting with a power take-off device. In FIGURE 2 there is shown a more simple adaptation of the invention wherein the speed of the engine is varied according to the power demand of the transmission. While the embodiment of FIGURE 2 may be provided with a power take-off device it is not shown because it is independent of the transmission and thus does not co-act therewith. The essential differences of FIGURE 2 as compared to FIGURE 1 are that in FIGURE 2 the adjustable relief valves 79 and 140 are eliminated, and the control rod 93 is pivotally connected at 155 to the throttle control lever 156 for engine 16 by means of a lost motion member 157. The lost motion member 157 is constructed similar to lost motion member 78 of FIGURE 10. A minimum throttle position stop means 158 may be provided for limiting the lowest fuel rate of supply to the engine 16. A tension spring 159 may be provided for urging the throttle control lever 156 toward the lowest fuel rate of supply to engine 16.

The operation of the transmission system of the invention will now be described.

*Operation*

Referring to FIGURE 1 it will first be assumed that the operator desires to operate the vehicle 15 in a straight line. He first loosens the fixed pivot assembly 103 and adjusts the track guide member 102 so that pointer 101 points to the desired maximum speed of travel shown on dial 100 of speed indicator 99. He then tightens the fixed pivot assembly 103 to fix the position of guide member 102. Next he actuates the pedal 72 to open the valve 71 which then communicates the discharge side of the pump 66 to the sump 21 through conduits 68, 45b and 45. The ram 73 thus will assume a fully retracted position whereby the variable displacement pump 18 is at zero displacement. Since the engine 16 has not yet been started the servo-mechanism 42 and 42' as well as the cumulative servo device 109 are fully retracted. Thus the displacement of the motors 33 and 33' are at their minimum displacement position.

The operator now starts the engine 16 but since the pump 18 is at zero displacement no fluid pressure is delivered to the conduit 22. The speed of the engine 16 actuates the fly-ball governor 133 to further compress spring 141 of the adjustable relief valve 140. Next the operator starts the small pump 66 which now circulates oil from sump 21 through conduits 67, 68, 45b and 45 back to the sump 21. Now the operator closes valve 71 which immediately results in elevation of pressure in conduits 68, 68a, 68b and 68c. Initially the control rod 93 will be in a rightward position because of the retraction of the cumulative servo-device 109 and thus the spring 83 of the adjustable relief valve 79 will be under increased compression.

The elevation in fluid pressure in conduit 68 now actuates the ram 73 which in turn actuates to increase the fluid displacement of pump 18. Thus the pump 18 now begins to deliver fluid pressure to conduit 22. Fluid under pressure in conduit 22 now enters the distributor 23 which divides the flow equally to conduits 32 and 47 thereby energizing fluid motors 33 and 33' respectively for moving the vehicle 15. Now assuming that the vehicle 15 is moving on a level road it can be seen the fluid pressure in conduits 32 and 47 must be limited to a maximum average value as otherwise the speed of the vehicle would increase beyond the selected maximum speed. As the mean fluid pressure in conduits 32 and 47 approaches the predetermined maximum value as set by the track guide member 102 the servo-device 109 actuates to a point where the control rod 93 is shifted leftwardly in sufficient magnitude to unseat the ball 82 of the adjustable relief valve 79 in throttling relation which effects a reduction in fluid pressure in conduits 68 and 68a. Reduction of fluid pressure in conduits 68a permits retractive movement of ram 73 which in turn decreases the fluid displacement of pump 18 until an equilibrium condition is reached whereby the mean fluid pressure in conduits 32 and 47 does not exceed the maximum value set by the track guide member 102. At this point it should be observed that the fluid pressure required to actuate the servo-device 109 is equal to or greater than that required to actuate the servo-mechanisms 42 and 42' for otherwise the servo-mechanisms 42 and 42' would be inoperative.

From the above it is apparent that if the load on wheels 38 and 38' increases the servo-device 109 will actuate to its stroke limit which ultimately reduces the displacement of pump 18 to approach zero but the engine 16 continues to operate without being overloaded nor shock loaded.

Now suppose the vehicle 15 is being propelled under normal operation but the load on the power take-off mechanism 129 is increased to the point where the speed of the engine 16 is reduced to a value below the predetermined minimum speed set by the fly-ball governor 133. The actuation of the governor 133 on the adjustable relief valve 140 reduces the operating pressure in the conduit 68 in a similar manner as that for the above described valve 79. Reduction of fluid pressure in conduit 68 results in corresponding retraction of the ram 73 which in turn reduces the fluid displacement of the pump 18. Reduction of fluid displacement of the pump 18 correspondingly reduces the fluid flow to motors 33 and 33' and the speed of the vehicle 15 is correspondingly reduced. Reduction of fluid displacement of pump 18 corrspondingly reduces the torque load requirement on shaft 17 by the pump 18. Reduction of torque load requirement for pump 18 makes available additional torque for driving the power take-off shaft 132 through gears 130 and 131. Thus it can be seen that in the event the power take-off mechanism demands the entire output of engine 16, the governor 133 would actuate valve 140 to by-pass fluid from conduit 68 sufficiently to permit full retraction of ram 73 thereby reducing the displacement of pump 18 to zero and the entire output of engine 16 is available to the power take-off mechanism 129. From this it is clear that the power demand of the power take-off mechanism 129 is pre-emptive and any power thereover delivered by engine 16 is available to the hydrostatic transmission for propelling the vehicle 15.

Now suppose the vehicle 15 is moving in soft ground and the wheel 38, only, engages ice or mire. The torque load on wheel 38 is immediately reduced thus permitting the speed of wheel 38 to increase. The reduced torque requirement on wheel 38 is immediately reflected in a corresponding reduction of fluid pressure in conduits 32, 32a and 32b. Reduction in fluid pressure in conduits 32, 32a and 32b permits retraction of servo-mechanism 42 thereby decreasing the fluid displacement of motor 33. At the same time the reduction of fluid pressure in conduit 32b also reduces the pressure in compartment 63 (FIGURE 3) of distributor 23. Reduction of pressure in compartment 63 creates a fluid pressure differential between compartments 61 and 63 of distributor 23 which now moves the plunger 53 in a rightward direction as viewed in FIGURE 3. The rightward movement of plunger 53 throttles downwardly the flow of fluid in conduit 32 and correspondingly increases flow into conduit 47. Thus the speed of wheel 38 remains the same as the speed of wheel 38' despite variations in torque requirements of the two wheels. But the rate of speed of the wheels 38 and 38' is inversely proportional to the sum of the torque requirements of both wheels.

Now again suppose the vehicle 15 is proceeding in a straightforward direction in normal operation and the operator desires to steer the vehicle leftwardly. The operator rotates the steering wheel 28 leftwardly which, through conventional steering mechanism 26, shifts the steerable wheels (not shown) for conventional leftward steering movement. Now unless the ratio of speed of drive wheel 38 with respect to wheel 38' is changed whereby wheel 38 rotates at a greater speed than wheel 38' one of the wheels must slide on the ground. The change in ratio of speed of wheel 38 with respect to wheel 38' to avoid slippage is accomplished in the following manner.

When the operator rotates steering wheel 28 and its associated column 29 as above mentioned the threads 65 shifts the running nut 29 in a leftward direction as viewed in FIGURE 3. Shifting of nut 29 leftwardly also shifts bracket 30 and thrust members 54 and 55 leftwardly which now urges corresponding leftward movement of plunger 53. Leftward movement of plunger 53 increases flow of fluid to conduit 32 and correspondingly decreases flow to conduit 47. This results in fixing the speed of wheel 38 with respect to wheel 38' in the same ratio as the flow of fluid in conduit 32 with respect to flow of fluid in conduit 47. Thus by proper selection of threads 65 and nut 29 the proper ratio of speed of wheel 38 with respect to wheel 38' can be obtained so that steering movement of the vehicle can be achieved without ground slippage of either wheel 38 or wheel 38'.

When the operator desires to stop the movement of vehicle 15 he merely actuates valve 71 through pedal 72 to open position which discharges fluid pressure in conduit 68 directly back to the sump 21. The pressure reduction in conduit 68 permits retraction of ram 73 and the fluid displacement of the pump 18 becomes zero and thus no fluid pressure is delivered to the motors 33 and 33'. When this occurs some braking action results on the wheels 38 and 38' as the coasting of the vehicle 15 now drives the motors 33 and 33' and they pump oil thereby creating a vacuum in conduit 22.

The form of the invention shown in FIGURE 2 functions in the same manner as that of FIGURE 1 except as follows. First, when the operator closes valve 71 the pump 18 is shifted to its maximum fluid displacement and remains thusly until the operator again opens valve 71 at which time the fluid displacement of pump 18 assumes its zero position. Thus, the pump 18 is controlled by ram 73 for maximum fluid displacement or zero displacement only. Second, when the maximum mean pressure in conduits 32 and 47 is reached in accordance with the selected setting of the track guide member 102 the servo-device 109 expands to move the control rod 93 leftwardly a sufficient magnitude for adjusting downwardly the rate of fuel supply to engine 16 thereby reducing the output of pump 18 through actuation of the throttle control lever 156 until an equilibrium condition is reached.

Having thus described preferred embodiments of the invention it can now be seen that the objects of the invention have been fully achieved and it must be understood that changes and modifications may be made which do not depart from the spirit of the invention nor from the scope thereof as defined in the appended claims.

What is claimed is:

1. A hydrostatic transmisison system comprising a power driven variable displacement fluid pump as a source of fluid under pressure communicatively connected to a fluid flow distributor, said distributor having first and second motor ports, first and second variable displacement fluid motors respectively connected communicatively to said first and second motor ports of said distributor, a first servo-mechanism positioned to control fluid displacement of said first motor responsive to fluid pressure directed to said first motor, a second servo-mechanism positioned to control fluid displacement of said second motor responsive to fluid pressure directed to said second motor, a cumulative servo-device communicatively connected to said motor ports of said distributor, said servo-device being operatively responsive cumulatively to fluid pressure directed to said motors, and control means operatively connected to said servo-device and said source for selectively controlling the fluid output of said source responsive to actuation of said servo-device whereby the mean value of fluid pressure directed to said motors is limited to a predetermined selected maximum value.

2. A hydrostatic transmission system for a self-propelled vehicle comprising a power driven variable displacement fluid pump as a source of fluid under pressure communicatively connected to a fluid flow distributor, said distributor having first and second motor ports, first and second variable displacement fluid motors mounted in drive relation respectively to a pair of ground engaging elements on said vehicle, said motors being communicatively connected respectively to said first and second motor ports, a first servo-mechanism positioned to control fluid displacement of said first motor responsive to fluid pressure directed to said first motor, a second servo-mechanism positioned to control fluid displacement of said second motor responsive to fluid pressure directed to said second motor, a cumulative servo-device communicatively connected to said motor ports of said distributor, said servo-device being operatively responsive cumulatively to fluid pressure directed to said motors, a control rod, adjustable link means operatively connecting said servo-device with one end of said control rod, said adjustable link means being selectively adjustable for governing the magnitude of movement of said control rod in relation to movement of said servo-device, and second means operatively connected to the other end of said control rod and said source for controlling the fluid output of said source responsive to actuation of said servo-device whereby the speed of said vehicle is limited to a predetermined selected maximum value.

3. A hydrostatic transmission system for a self-propelled vehicle comprising a power driven variable displacement fluid pump as a source of fluid under pressure communicatively connected to a fluid flow distributor, said distributor having first and second motor ports, first and second variable displacement fluid motors mounted in drive relation respectively to a pair of ground engaging elements on said vehicle, said motors being communicatively connected respectively to said first and second motor ports, a first servo-mechanism positioned to control fluid displacement of said first motor responsive to fluid pressure directed to said first motor, a second servo-mechanism positioned to control fluid displacement of said second motor responsive to fluid pressure directed to said second motor, means in said distributor for adjusting the ratio of fluid flow in said first motor port with respect to said second motor port responsive to steering movement of said vehicle, a cumulative servo-device communicatively connected to said motor ports of said distributor, said servo-device being operatively responsive cumulatively to fluid pressure directed to said motors, a control rod, adjustable link means operatively connecting said servo-device with one end of said control rod, said adjustable link means being selectively adjustable for governing the magnitude of movement of said control rod in relation to movement of said servo-device, and second means operatively connected to the other end of said control rod and said source for controlling the fluid output of said source responsive to actuation of said servo-device whereby the speed of said vehicle is limited to a predetermined selected maximum value.

4. A hydrostatic transmission system comprising a power driven variable displacement fluid pump communicatively connected to a fluid flow distributor, said distributor having first and second motor ports, first and second variable displacement fluid motors respectively connected communicatively to said first and second motor ports of said ditsributor, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, a cumulative servo-device communicatively connected to said motor ports of said distributor, said servo-device being operatively responsive cumulatively to fluid pressure directed to said motors, and control means operatively connected to said servo-device and said pump for selectively decreasing the fluid displacement of said pump responsive to actuation of said servo-device whereby the mean value of fluid pressure directed to said motors is limited to a predetermined selected maximum value.

5. A hydrostatic transmission system for a self-propelled vehicle comprising a power driven variable displacement fluid pump communicatively connected to a fluid flow distributor, said distributor having first and second motor ports, first and second variable displacement fluid motors mounted in drive relation respectively to a pair of ground engaging elements on said vehicle, said motors being communicatively connected respectively to said first and second motor ports, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, a cumulative servo-device communicatively connected to said motor ports of said distributor, said servo-device being operatively responsive cumulatively to increased fluid pressure directed to said motors, a control rod, adjustable link means operatively connecting said servo-device with one end of said control rod, said adjustable link means being selectively adjustable for governing the magnitude of movement of said control rod in relation to movement of said servo-device, a constant delivery source of fluid under pressure, a third servo-mechanism operatively positioned to increase fluid displacement of said pump, said third servo-mechanism being communicatively connected to said constant delivery source of fluid under pressure, an adjustable relief valve adapted to control the pressure from said constant delivery source having its inlet communicatively connected to said constant delivery source of fluid under pressure in by-pass relation, and movable means operatively connected to the other end of said control rod and said adjustable relief valve whereby said third servo-mechanism moves in a direction to decrease fluid displacement of said pump responsive to actuation of said servo-device for limiting the speed of said vehicle to a predetermined selected maximum value.

6. A hydrostatic transmission system for a self-propelled vehicle comprising a power driven variable displacement fluid pump communicatively connected to a fluid flow distributor, said distributor having first and second motor ports, first and second variable displacement fluid motors mounted in drive relation respectively to a pair of ground engaging elements on said vehicle, said motors being communicatively connected respectively to said first and second motor ports, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, means in said distributor for adjusting the ratio of fluid flow in said first motor port with respect to said second motor port responsive to steering movement of said vehicle, a cumulative servo-device communicatively connected to said motor ports of said distributor, said servo-device being operatively responsive cumulatively to fluid pressure directed to said motors, a control rod, adjustable link means operatively connecting said servo-device with one end of said control rod, said adjustable link means being selectively adjustable for governing the magnitude of movement of said control rod in relation to movement of said servo-device, a constant delivery source of fluid under pressure, a third servo-mechanism operatively positioned to increase fluid displacement of said pump, said third servo-mechanism being communicatively connected to said constant delivery source of fluid under pressure, an adjustable relief valve adapted to control the pressure from said constant delivery source having its inlet communicatively connected to said constant delivery source of fluid under pressure in by-pass relation, and movable means operatively connected to the other end of said control rod and said adjustable relief valve whereby said third servo-mechanism moves in a direction to decrease fluid displacement of said pump responsive to actuation of said servo-device for limiting the speed of said vehicle to a predetermined selected maximum value.

7. A hydrostatic transmission system comprising an engine driven variable displacement fluid pump communicatively connected to a fluid flow distributor, said distributor having first and second motor ports, first and second variable displacement fluid motors respectively connected communicatively to said first and second motor ports of said distributor, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, a cumulative servo-device communicatively connected to said motor ports of said distributor, said servo-device being operatively responsive cumulatively to fluid pressure directed to said motors, a power take-off device drivenly connected to said engine, a rotational speed actuated device mounted on said power take-off device, first means operatively connected to said speed actuated device and said pump for decreasing the fluid displacement of said pump responsive to actuation of said rotational speed actuated device wherein the power of said engine pre-emptively drives said power take-off mechanism, and the balance of said power from said engine being directed to said pump, and second means operatively connected to said servo-device and said pump for selectively decreasing the fluid displacement of said pump responsive to actuation of said servo-device whereby the mean value of fluid pressure directed to said motors is limited to a predetermined selected maximum value.

8. A hydrostatic transmission system for a self-propelled vehicle comprising an engine driven variable displacement fluid pump communicatively connected to a fluid flow distributor, said distributor having first and second motor ports, first and second variable displacement fluid motors mounted in drive relation respectively to a pair of ground engaging elements on said vehicle, said motors being communicatively connected respectively to said first and second motor ports, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, a cumulative servo-device communicatively connected to said motor ports of said distributor, said servo-device being operatively responsive cumulatively to increased fluid pressure directed to said motors, a control rod, adjustable link means operatively connecting said servo-device with one end of said control rod, said adjustable link means being selectively adjustable for governing the magnitude of movement of said control rod in relation to movement of said servo-device, a constant delivery source of fluid under pressure, a third servo-mechanism operatively positioned to increase fluid displacement of said pump, said third servo-mechanism being communicatively connected to said constant delivery source of fluid under pressure, a first adjustable relief valve adapted to control the pressure from said constant delivery source having its inlet communicatively connected to said constant delivery source of fluid under pressure in by-pass relation, movable means operatively connected to the other end of said control rod and said first relief valve for actuating said first relief valve in a direction to decrease pressure of said constant delivery source of fluid pressure for moving said third servo-mechanism in a direction to decrease fluid displacement of said pump responsive to actuation of said servo-device thereby limiting the speed of said vehicle to a predetermined selected maximum value, a power take-off mechanism drivenly connected to said engine, a rotational speed actuated device mounted on said power take-off mechanism, a second adjustable relief valve having its inlet communicatively connected to said constant delivery source of fluid under pressure in by-pass relation, said rotational speed actuated device being operably connected to actuate said second adjustable relief valve responsive to decreased rotational speed of said engine in a direction to decrease pressure of said constant delivery source of fluid pressure for moving said third servo-mechanism in a direction to decrease fluid displacement of said pump whereby the power of said engine pre-emptively drives said power take-off mechanism and the balance of said power from said engine being directed to said pump.

9. A hydrostatic transmission system for a self-propelled vehicle comprising an engine driven variable displacement fluid pump communicatively connected to a fluid flow distributor, said distributor having first and second motor ports, first and second variable displacement fluid motors mounted in drive relation respectively to a pair of ground engaging elements on said vehicle, said motors being communicatively connected respectively to said first and second motor ports, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, means in said distributor for adjusting the ratio of fluid flow in said first motor port with respect to said second motor port responsive to steering movement of said vehicle, a cumulative servo-device communicatively connected to said motor ports of said distributor, said servo-device being operatively responsive cumulatively to fluid pressure directed to said motor, a control rod, adjustable link means operatively connecting said servo-device with one end of said control rod, said adjustable link means being selectively adjustable for governing the magnitude of movement of said control rod in relation to movement of said servo-device, a constant delivery source of fluid under pressure, a third servo-mechanism positioned to increase the fluid displacement of said pump, said third servo-mechanism being communicatively connected to said constant delivery source of fluid under pressure, a first adjustable relief valve adapted to control the pressure from said constant delivery source having its inlet communicatively connected to said constant delivery source of fluid under pressure in by-pass relation, means operatively connected to the other end of said control rod and said first relief valve for actuating said first relief valve in a direction to decrease pressure of said constant delivery source of fluid under pressure for moving said third servo-mechanism in a direction to decrease fluid displacement of said pump responsive to actuation of said servo-device thereby limiting the speed of said vehicle to a predetermined selected maximum value, a power take-off mechanism drivenly connected to said engine, a rotational speed actuated device mounted on said power take-off mechanism, a second adjustable relief valve having its inlet communicatively connected to said constant delivery source of fluid under pressure in by-pass relation, said rotational speed actuated device being operably connected to actuate said second adjustable relief valve responsive to rotational speed of said engine in a direction to decrease pressure of said constant delivery source of fluid pressure for moving said third servo-mechanism in a direction to decrease fluid displacement of said pump whereby the power of said engine pre-emptively drives said power take-off mechanism and the balance of said power from said engine being directed to said pump.

10. A hydrostatic transmission system comprising an engine driven variable displacement fluid pump communicatively connected to a fluid flow distributor, said distributor having first and second motor ports, first and second variable displacement fluid motors respectively connected communicatively to said first and second motor ports of said distributor, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, a cumulative servo-device communicatively connected to said motor ports of said distributor, said servo-device being operatively responsive cumulatively to fluid pressure directed to said motors, and control means operatively connected to said engine and said servo-device for selectively decreasing the rotational speed of said engine responsive to actuation of said servo-device whereby the mean value of fluid pressure directed to said motors is limited to a predetermined selected maximum value.

11. A hydrostatic transmission system for a self-propelled vehicle comprising an engine driven variable displacement pump communicatively connected to a fluid flow distributor, said distributor having first and second motor ports, first and second variable displacement fluid motors mounted in drive relation respectively to a pair of ground engaging elements on said vehicle, said motors being communicatively connected respectively to said first and second motor ports, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, a cumulative servo-device communicatively connected to said motor ports of said distributor, said servo-device being operatively responsive cumulatively to increased fluid pressure directed to said motors, a control rod, adjustable link means operatively connecting said servo-device with one end of said control rod, said adjustable link means being selectively adjustable for governing the magnitude of movement of said control rod in relation to movement of said servo-device, a constant delivery source of fluid under pressure, a third servo-mechanism operatively positioned to increase fluid displacement of said pump, said third servo-mechanism being communicatively connected to said constant delivery source of fluid under pressure, a manually operated valve communicatively connected to said constant delivery source of fluid under pressure in by-pass relation, said manually operated valve being openable to discharge fluid pressure from said constant delivery source of fluid under pressure for moving said third servo-mechanism in a direction to decrease fluid displacement of said pump, a rate of fuel supply control means operatively positioned to regulate the rate of fuel directed to said engine, and the other end of said control rod being operably connected to said fuel supply control means for selectively decreasing the power delivered by said engine responsive to actuation of said servo-device whereby the speed of said vehicle is limited to a predetermined selected maximum value.

12. A hydrostatic transmission system for a self-propelled vehicle comprising an engine driven variable displacement fluid pump communicatively connected to a fluid flow distributor, said distributor having first and second motor ports, first and second variable displacement fluid motors mounted in drive relation respectively to a pair of ground engaging elements on said vehicle, said motors being communicatively connected respectively to said first and second motor ports, a first servo-mechanism positioned to increase fluid displacement of said first motor responsive to increased fluid pressure directed to said first motor, a second servo-mechanism positioned to increase fluid displacement of said second motor responsive to increased fluid pressure directed to said second motor, means in said distributor for adjusting the ratio of fluid flow in said first motor port with respect to said second motor port responsive to steering movement of said vehicle, a cumulative servo-device communicatively connected to said motor ports of said distributor, said servo-device being operatively responsive cumulatively to fluid pressure directed to said motors, a control rod, adjustable link means operatively connecting said servo-device with one end of said control rod, said adjustable link means being selectively adjustable for governing the magnitude of movement of said control rod in relation to movement of said servo-device, a constant delivery source of fluid under pressure, a third servo-mechanism operatively positioned to increase fluid displacement of said pump, said third servo-mechanism being communicatively connected to said constant delivery source of fluid under pressure, a manually operated valve communicatively connected to said constant delivery source of fluid under pressure in by-pass relation, said manually operated valve being openable to discharge fluid pressure from said constant delivery source of fluid under pressure for moving said third servo-mechanism in a direction to decrease fluid displacement of said pump, a rate of fuel supply control means operatively positioned to regulate the rate of fuel directed to said engine, and the other end of said control rod being operably connected to said fuel supply control means for selectively decreasing the power delivered by said engine responsive to actuation of said servo-device whereby the speed of said vehicle is limited to a predetermined selected maximum value.

References Cited in the file of this patent

UNITED STATES PATENTS

| | | |
|---|---|---|
| 1,143,727 | Robson | June 22, 1915 |
| 2,161,439 | Thoma | June 6, 1939 |
| 2,336,911 | Zimmerman | Dec. 14, 1943 |